United States Patent [19]

Takahashi et al.

[11] 4,251,388

[45] Feb. 17, 1981

[54] TITANIUM TRICHLORIDE CATALYTIC COMPONENT AND METHOD FOR HOMO- OR CO-POLYMERIZATION OF α-OLEFIN

[75] Inventors: Yoshikazu Takahashi, Hikari; Yoichi Sunada; Masaru Takitani, both of Shinnanyo, all of Japan

[73] Assignee: Toyo Stauffer Chemical Co., Ltd., Tokyo, Japan

[21] Appl. No.: 49,987

[22] Filed: Jun. 19, 1979

[30] Foreign Application Priority Data

Jun. 23, 1978 [JP] Japan ................................ 53-76168

[51] Int. Cl.³ .............................................. C08F 4/64
[52] U.S. Cl. ................................ 252/429 B; 526/142; 526/144
[58] Field of Search ..................................... 252/429 B

[56] References Cited

U.S. PATENT DOCUMENTS

| | | | |
|---|---|---|---|
| 3,094,568 | 6/1963 | Hay et al. ..................... | 252/429 B X |
| 3,825,524 | 7/1974 | Wada et al. .................. | 252/429 B X |
| 4,060,593 | 11/1977 | Kazuo et al. ................. | 252/429 A X |
| 4,085,064 | 4/1978 | Wristers ....................... | 252/429 B |
| 4,123,387 | 10/1978 | Shiga et al. .................. | 252/429 B |
| 4,127,504 | 11/1978 | Ueno et al. ................... | 252/429 B |
| 4,127,505 | 11/1978 | Ueno et al. ................... | 252/429 B |
| 4,136,243 | 1/1979 | Appleyard et al. .......... | 252/429 B X |

FOREIGN PATENT DOCUMENTS

| | | |
|---|---|---|
| 51-94496 | 3/1975 | Japan . |
| 51-90998 | 8/1976 | Japan . |
| 52-47954 | 4/1977 | Japan . |
| 52-115797 | 9/1977 | Japan . |
| 53-12796 | 2/1978 | Japan . |
| 1391067 | 4/1975 | United Kingdom ...................... 526/140 |

*Primary Examiner*—Patrick Garvin
*Attorney, Agent, or Firm*—Armstrong, Nikaido, Marmelstein & Kubovcik

[57] ABSTRACT

A titanium trichloride catalytic component obtained by separating it out of a solution consisting of titanium tetrachloride, an organic ether compound and an organo-aluminum compound dissolved in a solvent. The solvent is a mixture consisting of a saturated aliphatic hydrocarbon and/or an alicyclic hydrocarbon with 20 to 70% by volume of a concomitant aromatic hydrocarbon halide included therein. The organo-aluminum compound, the titanium tetrachloride and the organic ether compound is added to this mixed solvent at a solvent temperature not exceeding 55° C. Following this, the solvent temperature is raised up to a value between 45° and 150° C. over a period of 10 minutes to 24 hours with an organic ether compound and/or titanium tetrachloride further added during this temperature raising process to obtain thereby a titanium trichloride catalytic component having average particle diameter between 10 and 1000μ. Then homo- or co-polymerization of α-olefin is carried out by using a catalyst system comprising this catalytic component and an organo-aluminum compound.

9 Claims, 6 Drawing Figures

TITANIUM TRICHLORIDE CATALYTIC COMPONENT AND METHOD FOR HOMO- OR CO-POLYMERIZATION OF α-OLEFIN

BACKGROUND OF THE INVENTION

This invention relates to a titanium trichloride catalytic component of high activity advantageously usable in the manufacture of a highly steriospecfic α-olefin polymer and also relates to a method for homo- or co-polymerization of an α-olefin which is carried out in the presence of this catalytic component and an organo-aluminum compound to obtain a highly steriospecific polymer.

More specifically stated, this invention relates to an α-olefin polymerizing titanium trichloride catalytic component obtained in such a manner that, in having a titanium trichloride catalytic component separated from a solution prepared by dissolving titanium tetrachloride, an organic ether compound and an organo-aluminum compound in a solvent, the solvent is a mixed solvent which is prepared by allowing 20 to 70% by volume of an aromatic hydrocarbon halide to be concomitant in a mixed solvent consisting of a saturated aliphatic hydrocarbon and/or an alicyclic hydrocarbon; the organo-aluminum compound, the titanium tetrachloride and the organic ether compound are added to the mixed solvent at a solvent temperature not exceeding 55° C.; following this addition, the solvent temperature is raised up to 45°–150° C. over a period of time 10 minutes to 24 hours; and, during the temperature raising process, the organic ether compound and/or the titanium tetrachloride is further added at a temperature between 40° and 70° C. or, if a temporary cooling period is included in the temperature raising process, is further added either at the above stated temperature or at the time of temporary cooling, thus to have an α-olefin polymerizing titanium catalytic component of average particle diameter 10 to 1000μ separated out, and also relates to a method for homo- or co-polymerization of α-olefin which is carried out in the presence of a catalyst system comprising this titanium trichloride catalytic component and an organo-aluminum compound.

An important feature of the invention lies in that the average particle diameter of the titanium trichloride catalystic component which is separated out in accordance with this invention is adjustable within a wide range from 10 to 1000μ as desired and that the catalytic component thus obtained has highly uniform particle diameter and is highly active when it is used for the polymerization of α-olefin. In addition to these advantages, a polymer of extremely uniform particle diameter can be obtained by carrying out homo- or co-polymerization of α-olefin with a catalyst system which is prepared using this catalytic component in combination with an organo-aluminum compound; and, in accordance with the invented method, the deashing process and the washing process which are normally considered indispensable for the manufacture of an olefin polymer can be either omitted or simplified. Further, in accordance with this invention, a pelletizing process also can be omitted.

DESCRIPTION OF THE PRIOR ART

A catalytic component to be used for polymerization of α-olefin these days is required to have a sufficiently high polymerizing activity to obviate the necessity of the deashing and washing processes for removal of a catalyst residue and non-stereospecific polymer from the polymer produced; to have a high productivity for a stereospecific polymer; to ensure that the catalytic component and the polymer produced therefrom have a suitable particle diameter; and to have a uniform particle size. The reason for such requirements lies in the fact that the catalytic components and the polymer products that are obtained by the conventional methods in a powery state have uneven particle size and this has been making separation, drying and transportation of them difficult. This has been causing troubles in manufacturing operations and thus has been lowering the industrial productivity of them.

Further, it is also desired that a catalytic component for such a purpose permits omission of a pelletizing process in the manufacture of an α-olefin polymer.

In an α-olefin polymer manufacturing plant using a titanium trichloride catalytic component which is obtained by a conventional method, a powdery polymer obtained through a polymerization process is dried; then, the dried polymer has to be pelletized through melting, kneading and molding before it is shipped as polymer product for use in molding processes. At such an α-olefin polymer manufacturing plant, the pelletizing process has been requiring the largest portion of the cost of facilities and also consumes a large amount of energy. If it is possible to prepare a catalytic component that permits the manufacture of a polymer which is highly homogeneous in particle diameter distribution including no minute polymer particles therein, it not only enhances the operation efficiency of the polymer manufacturing plant but also the troublesome process of pelletizing the polymer product can be omitted. Then, this would save a large amount of cost of facilities and energy consumption and would greatly contribute to the rationalization of the polymer manufacturing process. Therefore, development of such an ideal catalytic component has been strongly desired.

For polymerization of α-olefin, Ziegler-Natta catalysts have heretofore been employed in general. A typical example of such catalysts is a catalyst system consisting of a combination of the δ-type titanium trichloride-aluminum chloride eutectic mixture (hereinafter will be called a δ-type eutectic mixture) and an organo-aluminum compound. The δ-type eutectic mixture is obtained by pulverizing and activating, in accordance with a known method using a ball mill or a viabration mill or the like, a γ-type titanium trichloride-aluminum chloride eutectic mixture (hereinafter will be called the γ-type eutectic mixture) which is obtained by reducing titanium tetrachloride with aluminum powder in the presence of aluminum chloride. However, with the δ-type eutectic mixture employed as catalytic component for α-olefin polymerization, polymerization activity and the productivity for a stereospecific polymer are low and not satisfactory. Nowadays, there have been proposed many methods for reformation of the γ- or δ-type eutectic mixture including for example: (1) A method of co-pulverizing the δ-type eutectic mixture or the γ-type eutectic mixture and a reforming agent such as an electron donor compound or allowing them to react upon each other. (2) A method of washing the γ-type or δ-type eutectic mixture with an inert hydrocarbon solvent. (3) A method of heating the γ-type or δ-type eutectic mixture.

The reformation or denaturation methods improve the polymerization activity of the catalytic component and the productivity for a stereospecific polymer to a certain degree. These methods, however, are utterly incapable of permitting control over the particle diameter of the catalytic component and also are far from meeting the requirement of obviating the necessity of the deashing and washing processes.

Further, recently, there have been developed some catalytic components which have a high polymerizing activity and ensure a high degree of productivity for a stereospecific polymer. In an example of the methods for obtaining such a catalytic component (disclosed by a Japanese patent application laid-open No. 47-34478), (1) a β-type titanium trichloride-aluminum chloride eutectic mixture (hereinafter will be called the β-type eutectic mixture) is prepared by reducing titanium tetrachloride with an organo-aluminum compound at a low temperature; (2) the β-type eutectic mixture is treated with a complex-making agent to remove a portion of the aluminum component in the β-type eutectic mixture; and then (3) it is heat treated in titanium tetrachloride to obtain a δ-type eutectic mixture presenting a dark purple color. The catalytic component is excellent having a high degree of polymerizing activity which is several times greater than that of the catalytic component of the δ-type eutectic mixture which is obtained by the above stated pulverization process. However, this method of manufacturing a catalytic component has the following drawbacks: (1) A long period of time is required for the manufacture. (2) It requires a large quantity of a washing liquid for washing the catalytic component. (3) It produces a large quantity of waste liquid containing titanium ion and aluminum ion. (4) Therefore, it necessitates the use of a large quantity of neutralizing reagent and thus requires a large amount of energy for prevention of environmental pollution and for recovery of the solvent used. Accordingly, this results in a very high cost of manufacture of the catalytic component.

To eliminate the above stated drawbacks, there have been proposed improved methods for the manufacture of a catalytic component. These improved methods include: (1) A method in which a liquid matter obtained by treating titanium tetrachloride, in the presence of an organic ether compound, with an organo-aluminum compound expressed by a generic formula of $AlR_nX_{3-n}$ (wherein R represents an alkyl group having a carbon number 1 to 10; X a halogen atom; and n a real number of $0 < n \leq 3$) is brought into contact with a liberating agent such as Lewis acid at a temperature not exceeding 150° C. to have a titanium trichloride catalytic component separated out in a fine powdery state (Japanese patent applications laid-open Nos. 51-16298 and 51-76196). (2) An improvement over the above stated method (1) in which the liberating agent is not used (Japanese patent application laid-open No. 52-47594). (3) A method in which a titanium trichloride catalytic component is allowed to separate out by using seed crystals in carrying out the above stated method (1) (Japanese patent application laid-open No. 51-94496). (4) A method in which a titanium trichloride catalytic component is allowed to separate out by varying the operation temperature in carrying out the above stated method (1) (Japanese patent application laid-open No. 51-90998). Each of these catalytic component manufacturing methods doesn't require the use of a solvent in large quantity and, accordingly, produces a waste liquid in small quantity. Each of them, however, has a drawback in that: The average particle diameter of the titanium trichloride chatalytic component obtained by the method is at the most about 30μ and normally measures only several μ and that bulk density thereof is too small for easy handling. Further, when the catalytic component is used for α-olefin polymerization, the particle diameter and the bulk density of the polymer product thus obtained are small and the productivity of a stereospecific polymer is low. Besides, since the polymer product thus obtained is in a powery state, it necessitates a pelletizing process.

As described in the foregoing, the properties of the catalytic components for α-olefin polymerization manufactured by the methods of prior arts and those of the olefin polymers polymerized in the presence thereof are not satisfactory. Therefore, further improvement over these catalytic components has been desired.

SUMMARY OF THE INVENTION

The inventors of this invention strenuously conducted studies for a method of manufacturing a titanium trichloride catalytic component which has a high degree of polymerizing activity as well as a high productivity for a stereospecific polymer and, at the same time permits to freely control the particle diameter thereof to permit in turn to control as desired also the particle diameter of an olefin polymer product to be obtained therefrom. These studies have led to the completion of the present invention.

It is therefore an object of this invention to provide a titanium trichloride catalytic component which is usable for polymerization of α-olefin and which is prepared in such a manner that: In separating a titanium trichloride catalytic component from a solution obtained by dissolving titanium tetrachloride, an organic ether compound and an organo-aluminum compound in a solvent, a mixed solvent which consists of a saturated aliphatic hydrocarbon and/or an alicyclic hydrocarbon with 20 to 70% by volume of an aromatic hydrocarbon halide allowed to be concomitant therein is employed as the solvent. The organo-aluminum compound, the titanium tetrachloride and the organic ether compound is added to the mixed solvent at a solvent temperature not exceeding 55° C. The solvent temperature is then raised up to a temperature between 45° and 150° C. over a period of 10 minutes to 24 hours. An organic ether compound and/or titanium tetrachloride is further added at a temperature between 40° and 70° C. during the temperature raising process or, where a temporary cooling period is included in the temperature raising process, the further addition is effected during such a temporary cooling period. A titanium trichloride catalytic component of average particle diameter measuring 10 to 1000μ is then caused to be separated out through this process. This average particle diameter is adjustable as desired within the range from 10 to 1000μ and the α-olefin polymerizing titanium trichloride catalytic component which is thus obtained has a high degree of activity and is capable of forming a stereospecific polymer at a high degree of productivity.

It is another object of the present invention to provide a method for homo- or co-polymerization of α-olefin in which the polymerization is carried out in the presence of this catalytic component to obtain a highly stereospecific polymer having a highly uniform particle diameter.

In accordance with this invention, it is mandatory that the solvent which is to be used for dissolving the titanium tetrachloride, the organic ether compound and the organo-aluminum compound therein is prepared by allowing an aromatic hydrocarbon halide to exist in the saturated aliphatic hydrocarbon and/or the alicyclic hydrocarbon. It is by this arrangement that the particle diameter of the titanium trichloride catalytic component to be obtained can be adjusted as desired. If the solvent consists of only the saturated aliphatic hydrocarbon and/or the alicyclic hydrocarbon without having the aromatic hydrocarbon halide mixed therein or, conversely, if the solvent consists of only the aromatic hydrocarbon halide, there would be produced a titanium trichloride catalytic component of extremely fine particle size with which the object and the advantageous effects of the present invention hardly can be attained and which is hardly usable as catalytic component for polymerization of α-olefin.

This fact is an amazing discovery which has never been anticipated by known prior arts and the present invention is of great significance for industrial applications. The titanium trichloride catalytic component has a high degree of activity and also has a high productivity for a stereospecific polymer, so that the deashing and washing process can be either omitted or simplified. Besides, the titanium trichloride catalytic component obtained in accordance with this invention and a polymer obtained from the use of this catalytic component have uniform particle diameter respectively. A further advantage of the invention lies in that the particle diameter is adjustable as desired, so that the properties such as fluidity can be adjusted to be suitable for use at any types of plants. It is another advantageous feature of the invention that the adjustability of the polymer product to any desired particle diameter makes it possible to omit a pelletizing process.

In accordance with the present invention, the halogen of the aromatic hydrocarbon halide to be used is selected out of the group consisting of chlorine, bromine, iodine and fluorine. Taking chlorinated aromatic hydrocarbons and brominated aromatic hydrocarbons as examples, the aromatic hydrocarbon halide may be selected out of the group including chlorinated aromatic hydrocarbons such as chloro-benzene, chloro-toluene, chloro-xylene, chloro-ethyl benzene, dichlorobenzene, dichloro-toluene, dischloro-xylene, trichlorobenzene, trichloro-toluene, chlorobromo-benzene, etc. and brominated aromatic hydrocarbons such as bromobenzene, bromo-toluene, bromo-xylene, bromo-ethyl benzene, dibromo-benzene, dibromo-toluene, dibromo-xylene, tribromo-benzene, tribromo-toluene, etc. Of these chlorinated and brominated aromatic hydrocarbons, it is preferable to use chloro-benzene, chloro-toluene, chloro-xylene, dichloro-benzene, dichloro-xylene, bromo-benzene, bromo-toluene, bromo-xylene, dibromo-benzene, dibromo-toluene, dibromo-xylene, etc.

The saturated aliphatic hydrocarbon to be employed in accordance with this invention is a compound having a boiling point at 65° C. and above and preferably above 80° C. For example, the saturated aliphatic hydrocarbon may be selected out of the group consisting of n-hexane, n-heptane, and n-decane. The alicyclic hydrocarbon preferably has a boiling point at 65° C. and above and may be selected, for example, out of the group consisting of cyclo-hexane, cyclo-heptane, cyclo-octane, methylcyclo hexane, etc.

In an example of methods for adjustment of the particle diameter of the titanium trichloride catalytic component, with an aromatic hydrocarbon halide arranged to be included in the saturated aliphatic hydrocarbon and/or alicyclic hydrocarbon (hereinafter will be called the mixed solvent), the particle diameter is controlled as desired by adjusting the concentration of the aromatic hydrocarbon halide in the mixed solvent.

The concentration of the aromatic hydrocarbon halide in the mixed solvent is 20 to 70% by volume, preferably 25 to 65% by volume and more preferably 30 to 60% by volume. Within this range of concentration, the particle diameter of the titanium trichloride to be produced becomes smaller according as the concentration of the aromatic hydrocarbon halide increases and, conversely, becomes larger according as the concentration decreases. With the concentration less than 20% by volume, for example, the particle diameter of the titanium trichloride catalytic component becomes uneven and the polymerizing activity of the catalytic component and the stereospecificity of the polymer to be obtained therefrom are extremely lowered. On the other hand, when the concentration exceeds 70% by volume, the particle diameter of the catalytic component becomes so small that filtration and washing of the titanium trichloride catalytic component thus obtained become difficult and this results in lowered productivity for the catalytic component.

The titanium tetrachloride is used in the ratio of 5 mol and less to 1 liter of the mixed solvent, preferably 2 mol and less and more preferably 1.5 mol and less. There is no particular limitation to the lower limit value for the titanium tetrachloride. However, for the productivity for the titanium trichloride catalytic component, it is preferable to set the lower limit of the ratio at 0.01 mol.

The organic ether compound to be used in accordance with this invention is preferably a compound that is expressed by a generic formula ROR', wherein R and R' represent alkyl groups which are the same or different from each other with at least one of them having a carbon number not exceeding 5. The compound is selected out of the group consisting of di-n-amyl ether, di-n-butyl ether, di-n-propyl ether, n-amyl-n-butyl ether, n-amyl isobutyl ether, a n-butyl-n-propyl ether, n-butyl isoamyl ether, n-propyl-n-hexyl ether, n-butyl-n-octyl ether, etc. Of these compounds, the use of di-n-butyl ether brings about the best result. The organic ether compound to be dissolved in the mixed solvent is used in quantity 0.8 to 3 mol for 1 mol of the titanium tetrachloride and preferably 1 to 2.5 mol. If less than 0.8 mol of the organic ether compound is used for 1 mol of the titanium tetrachloride, the polymerizing activity of the titanium trichloride catalytic component thus produced would decrease and the productivity thereof for a stereospecific polymer would be lowered. Conversely, if the quantity of the organic ether compound exceeds 3 mol, not only the yield of the catalytic component would be lowered but the polymerization activity and the stereospecific polymer productivity of the catalytic component would also decrease.

As for the organo-aluminum compound to be used in accordance with this invention, a compound that is expressed by a generic formula of $AlR_nX_{3-n}$, wherein R represents an alkyl group having a carbon number 1–10, X a halogen or hydrogen atom and n a real number of $0 < n \leq 3$, is usable as organo-aluminum compound of the invention. The organo-aluminum compound in which, for example, n=3 may be selected from the group consisting of trimethyl aluminum, triethyl aluminum, tri-n-propyl aluminum, tri-n-butyl aluminum, triisobutyl aluminum, tri-n-pentyl aluminum, tri-n-hexyl aluminum, triisohexyl aluminum, tri-n-octyl aluminum, etc. The compound in which X is a hydrogen atom may be selected out of the group consisting of dimethyl aluminum hydride, methyl aluminum dihydride, diethyl aluminum hydride, ethyl aluminum dihydride, di-n-butyl aluminum hydride, n-butyl aluminum dihydride, diisobutyl aluminum hydride, isobutyl aluminum dihydride, di-n-pentyl aluminum dihydride, di-n-hexyl aluminum hydride, diisohexyl aluminum hydride, di-n-octyl aluminum hydride, etc. The compound in which X is a halogen atom may be selected for example out of chlorides such as dimethyl aluminum chloride, diethyl aluminum chloride, di-n-propyl aluminum chloride, di-n-butyl aluminum chloride, diisobutyl aluminum chloride, di-n-pentyl aluminum chloride, di-n-hexyl aluminum chloride, diisohexyl aluminum chloride, di-n-octyl aluminum chloride, di-n-octyl aluminum chloride, methyl aluminum sesqui-chloride, ethyl aluminum sesqui-chloride, n-propyl aluminum sesqui-chloride, n-butyl aluminum dichloride, isobutyl aluminum dichloride, n-hexyl aluminum dichloride, isohexyl aluminum dichloride, etc. The organo-aluminum compound may be diluted to a suitable degree with an aromatic hydrocarbon such as benzene, toluene, xylene, etc., or with the aromatic hydrocarbon halide, the saturated aliphatic hydrocarbon or the alicyclic hydrocarbon which is used for the preparation of the mixed solvent in accordance with the invention, or with a mixture of them. The organo-aluminum compound is used for the purpose of reducing a tetravalent titanium. Theoretically, addition of the organo-aluminum compound in quantity equivalent to the tetravalent titanium suffices. However, in the presence of the aromatic hydrocarbon halide, the addition quantity of the organo-aluminum compound is also interrelated with the particle diameter of the titanium trichloride catalytic component to be obtained. It is, therefore, preferable to add the organo-aluminum compound in quantity 0.3 to 1.8 equivalent of the titanium tetrachloride. If the organo-aluminum compound is added in quantity less than 0.3 equivalent of the titanium tetrachloride, the yield rate of the titanium trichloride catalytic component decreases to a great degree. Conversely, addition quantity exceeding 1.8 equivalent of the titanium tetrachloride lowers the polymerization activity and the stereospecific polymer productivity. Further, within this range of addition quantity of the organo-aluminum compound, the particle diameter of the catalytic component decreases as the addition quantity increases.

In another method for adjusting the particle diameter of the titanium trichloride catalytic component, the particle diameter also can be controlled by adjusting the composition of the organic ether compound—titanium tetrachloride—organo-aluminum compound system. However, this method also requires the presence of the aromatic hydrocarbon halide. Otherwise, the adjustment of the particle diameter of the titanium trichloride catalytic component is impossible. For example, in cases where the concentrations of the organic ether compound and the titanium tetrachloride are fixed, the particle diameter of the catalytic component thus obtained decreases as the concentration of the organo-aluminum compound increases. If the concentrations of the titanium tetrachloride and the organo-aluminum compound are fixed, the particle diameter of the catalytic component decreases as the concentration of the organic ether compound increases.

As for the organic ether compound to be added during the temperature raising process or at the time of temporary cooling during the temperature raising process in accordance with this invention, the desired effect of this addition can be attained by the use of any of the organic ether compounds mentioned in the foregoing. Then, the addition quantity of the organic ether compound is less than 4 mol for 1 mol of the titanium tetrachloride included in the mixed solution, preferably less than 3.5 mol and more preferably less than 2.4 mol. If the addition quantity exceeds 4 mol, there takes place flocculation between particles to form a coarse coagulative titanium trichloride catalytic component, which has a lower effect as catalytic component for polymerization of α-olefin. There is no lower limit to the addition quantity. However, no salient effect can be expected from addition quantity less than 0.01 mol.

As regards other matters to be added besides the above stated organic ether compound during the temperature raising process or at the time of temporary cooling during the temperature raising process, titanium tetrachloride is also added either alone or in a state of being mixed with the organic ether compound or in the form of a complex consisting of the two.

The addition quantity of the above stated titanium tetrachloride to be added during the temperature raising process in accordance with the present invention is at least 0.01 mol for 1 mol of the titanium tetrachloride which is included in the mixed solution, preferably more than 0.02 mol and more preferably more than 0.04 mol. If the addition quantity is less than 0.01 mol, the polymer would lack transparency.

The above stated complex consisting of an organic ether compound and titanium tetrachloride may be selected out of combinations of titanium tetrachloride and diethyl ether, titanium tetrachloride and di-n-propyl ether, titanium tetrachloride and di-n-butyl ether, titanium tetrachloride and diisoamyl ether, titanium tetrachloride and isoamyl-n-butyl ether, etc.

The above stated mixture or complex is added in quantity equivalent to the solo addition quantity of the above stated organic ether compound or the titanium tetrachloride. In accordance with this invention, the time at which the organic ether compound, titanium tetrachloride or a mixture or complex consisting of the organic ether compound and titanium tetrachloride is added is as follows: After the total quantity of the organo-aluminum compound is added at a solvent temperature not exceeding 55° C. in the presence of 20 to 70% by volume of the concomitant aromatic hydrocarbon halide in the mixed solvent, the solvent temperature is raised up to a value between 45° and 150° C. over a period of time between 10 minutes and 24 hours. Then, the organic ether compound, titanium tetrachloride or their mixture or complex is added at a desired point of time during the temperature raising process. However, in cases where the solvent temperature is raised to a value between 40° and 80° C. to obtain a slurry and the slurry thus produced is then temporarily cooled and again is heated to bring the solvent temperature between 45° and 150° C., the addition is effected at a desired point of time either during the temporary cooling period or during the heating period after the temporary cooling period. However, where such temporary cooling is not included in the temperature raising process, it is preferable to add only the organic ether compound.

In an example of manufacturing processes, the titanium trichloride catalytic component of the present invention is obtained through the following procedures: The titanium tetrachloride and the organic ether compound are dissolved in the mixed solvent either separately or in the form of a mixture or a complex. Following this, the organo-aluminum compound is added to be dissolved therein. In dissolving the organo-aluminum compound, the temperature of the mixed solvent must be arranged to be below 55° C., preferably below 50° C. and more preferably below 45° C. If the organo-aluminum compound is added at a solvent temperature exceeding 55° C., the titanium tetrachloride would be immediately reduced to separate out a titanium trichloride catalytic component in a state of fine particles. This not only would make adjustment of the particle diameter of the titanium trichloride catalytic component difficult but also would make difficulties for filtration and washing thereof and thus would result in lowered productivity.

After addition of the organo-aluminum compound, the temperature of the mixed solvent is raised up to a temperature between 45° and 150° C., preferably between 65° and 120° C. and more preferably between 75° and 110° C. The length of time required for raising the temperature up to the prescribed value ranges from 10 minutes to 24 hours, preferably from 30 minutes to 12 hours and more preferably from 1 to 8 hours, though it depends upon difference between the temperature values before and after the temperature raising process. This process is carried out for the purpose of reducing the titanium tetrachloride with the organo-aluminum compound to obtain the titanium trichloride catalytic component of highly uniform particle diameter. If the temperature is too quickly raised in a short period of time, say, less than 10 minutes from the temperature at which the organo-aluminum compound is added, the particle diameter of the titanium trichloride catalytic component would become uneven. Conversely, even if the temperature is too slowly raised over a long period of time, say, exceeding 24 hours, the process would not bring about any greater effect. On the other hand, if the temperature is raised up to a value less than 45° C., the reduction reaction would take place at a slow velocity, which would result in a poor productivity. However, the upper limit of the raised temperature must be determined at a temperature lower than the boiling point of the compound that has the lowest boiling point among the saturated aliphatic hydrocarbon or alicyclic hydrocarbon and the aromatic hydrocarbon halide employed. The upper limit is thus normally set at 150° C.

Meanwhile, the organic ether compound which is to be added during the temperature raising process must be added at a desired point of time while the temperature of the mixed solvent is between 40° and 70° C. If a catalytic component which has been prepared by adding the organic ether compound outside of this prescribed temperature range is used for polymerization, a polymer product thus obtained not only would lack transparency but also would hardly have a true spherical shape.

After completion of the temperature raising process, it is preferable to retain the raised temperature for a period of time between several minutes and several ten minutes to ensure completion of the reducing reaction, though there is no particular restriction on the length of that period.

Through the above stated process, it is possible to obtain a novel titanium trichloride catalytic component having a true spherical shape and highly uniform particle diameter which is adjustable as desired within the range from 10 to 1000μ. The catalytic component thus obtained is thoroughly washed with either a hydrocarbon solvent or an aromatic hydrocarbon halide solvent. After washing, the catalytic component can be stored either in a slurry-like state or in a dried state through filtration and drying processes.

Figure 1:
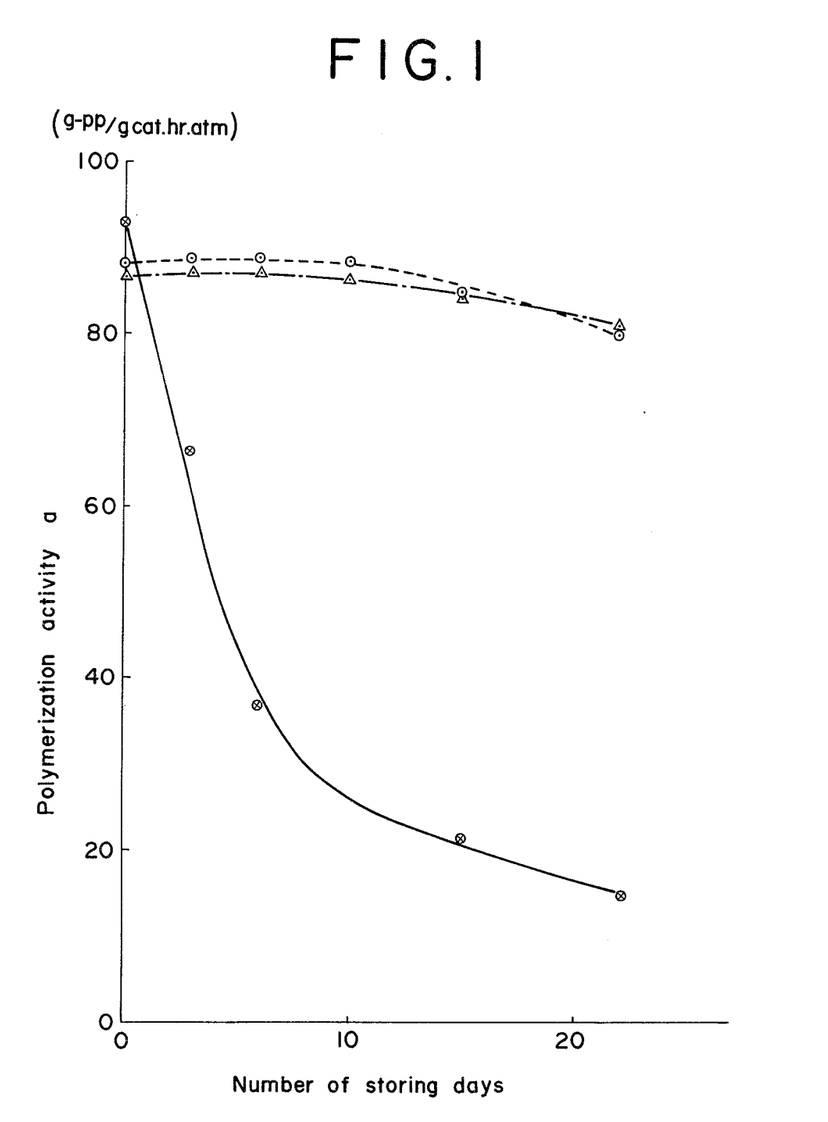
FIG. 1 is a graph showing the ageing deterioration in the polymerization activity of the titanium trichloride catalytic component of the present invention which takes place when the catalytic component is stored at 45° C. in dry nitrogen, the ordinate of the graph showing the polymerization activity a, the abscissa the number of storing days respectively and marks used in the graph indicating.

The titanium trichloride catalytic component obtained in accordance with the present invention has high activity, which does not degrade as shown in the accompanying drawing FIG. 1 in which the ordinate shows the polymerization activity of the titanium trichloride stored in nitrogen at temperature 45° C. and the abscissa the number of storing days. Besides, compared with the conventional titanium trichloride catalytic components, the catalytic component of the present invention excels in stability because it does not have much reactivity to oxygen and moisture content.

Further, compared with a polymer product which is obtained in accordance with the method disclosed by the present inventors in Japanese Kokai No. 54-90094 which presents a white muddy color, the polymer product obtained in accordance with this invention excels in transparency. Particularly, it is a feature of the invention that the titanium trichloride catalytic component obtained and a polymer obtained therefrom have a shape close to a true spherical shape and permit to let the polymer have a high bulk density.

The titanium trichloride catalytic component is used to form an α-olefin polymerizing catalyst system in combination with an organo-aluminum compound expressed by a generic formula of $AlR_nX_{3-n}$ wherein R represents an alkyl group, X a halogen atom and n a real number of $0 < n \leq 3$. The organo-aluminum compound may be selected out of the group consisting of triethyl aluminum chloride, diethyl aluminum chloride, ethyl aluminum dichloride, ethyl aluminum sesquichloride, triisobutyl aluminum, diisobutyl aluminum chloride, etc.

The quantitative ratio of the titanium trichloride catalytic component to the organo-aluminum compound can be determined as desired within a wide range by those skilled in the art. Normally, however, the mole ratio is between 1:1 and 1:20. Further, in carrying out the α-olefin polymerizing method of this invention, the catalyst system may be used in combination with an electron donor of the kind generally employed.

The polymerization may be carried out by a suspension polymerization process in which an inert hydrocarbon selected from the group consisting of an aromatic hydrocarbon such as benzene, toluene, exylene, etc., or an aliphatic hydrocarbon such as heptane, hexane, octane, etc. or an alicyclic hydrocarbon such as cyclohexane, cyclo-heptane, etc. is employed as solvent; by a liquid phase polymerization process in which a liquefied monomer is employed as solvent; or by a gas phase polymerization process in which a monomer is used in a gas phase. As for the mode of carrying out the polymerization, either a continuous processing mode or a batch processing mode can be adoped. Polymerization temperature is set between 30° and 120° C. and preferably between 50° and 100° C. while polymerization pressure is set between atmospheric pressure and 50 atm.

The α-olefin to be homo- or co-polymerized by the catalyst system of the present invention includes ethylene, propylene, butane-1, 4-methyl pentane, etc. The molecular weight of the polymer can be adjusted by a known method of using hydrogen or diethyl zinc.

When the titanium trichloride catalytic component is used for polymerization of the α-olefin in accordance with the polymerization method of this invention, the polymerizing activity of the catalytic component is very high. The polymer thus obtained has high stereospecificity and high bulk density. With the particle diameter of the titanium trichloride catalytic component suitably adjusted, a polymer product having highly uniform particle diameter measuring within the range from 0.5 to 15 mm can be obtained. The polymer is of an approximately true spherical shape having a good fluidity and, despite of its large particle diameter, also has a good deliming property.

The objects, features and advantages of the invention will appear more fully hereinafter from the following description of embodiments thereof when read in connection with the accompanying drawing.

BRIEF DESCRIPTION OF THE DRAWINGS

⊙ : A titanium trichloride catalytic component obtained in accordance with Embodiment Example 7

△ : A titanium trichloride catalytic component obtained in accordance with Embodiment Example 17

⊗ : A conventional titanium trichloride catalytic component

All of the photographs FIGS. 2 through 6 are reduced to a scale of 1:1.5.

PREFERRED EMBODIMENTS OF THE INVENTION

The invention will be more clearly understood from the following description of embodiment examples. However, it is to be understood that the scope of the invention is not limited to these embodiment examples. Further, the symbols used for description of these embodiment examples and comparison examples denote the following:

a: The number of grams (g-pp) of the polymer produced within a unit period of time (hr), at a unit pressure (atm), per gram of the catalytic component (g-pp/g-cat, hr-atm).

p: The number of grams of the polymer produced per gram of the catalytic component.

$$H.I.: \frac{\text{A boiling n-heptane insoluble component in solid polymer produced (g)}}{\text{Solid polymer produced (g)}} \times 100 \, (\%)$$

-continued $$I.I.: \frac{\text{Solid polymer produced (g)} \times H.I.}{\text{Solid polymer produced (g)} + \text{polymer soluble in polymerization solvent}} \, (\%)$$

dc: Average particle diameter value (μ) obtained by measuring, with a microscope, the diameter of 50 particles of each of the titanium trichloride catalytic component and the polymer.

ρ: The bulk density (g/ml) of the solid polymer product as measured by Method A or B of ASTM-D-1895-69.

dp,σ: The geometrical average diameter and standard deviation of the polymer product in a logarithmic probability distribution formula.

EMBODIMENT EXAMPLE 1

Preparation of the Titanium Trichloride Catalytic Component

The inside of a four-necked flask of 500 ml equipped with a stirrer was replaced with dry nitrogen. Following this, 250 ml of a mixed solvent which consists of monochloro benzene and n-heptane with 33% by volume of the monochloro benzene mixed therein as aromatic hydrocarbon halide was introduced into the flask. To this was added 24.2 ml of titanium tetrachloride (0.22 mol, corresponding to 0.88 mol TiCl$_4$/1 mixed solvent). The mixed solution was kept at a temperature between 20° and 23° C. with stirring. To this mixed solution was added by dropping with stirring 46.4 ml of di-n-butyl ether (0.28 mol—the mole ratio of di-n-butyl ether to the titanium tetrachloride corresponds to 1.3) over a period of 10 minutes. After completion of the dropping process, 13.8 ml of diethyl aluminum chloride (0.11 mol, the addition quantity of the diethyl aluminum chloride relative to the titanium tetrachloride corresponds to 1.0 equivalent) was added to the mixture over a period of 40 minutes. The mixture solution was then heated to have the temperature of it rise 1° C. at every 3.5 minutes. When the temperature of the mixed solution reached 55° C., 10.1 ml of di-n-butyl ether (0.06 mol, the mole ratio to the titanium tetrachloride corresponds to 0.27) was further added by dropping over a period of 35 minutes. When the dropping is completed, the temperature of the mixed solution was 65° C. After that, the temperature of the mixed solution was further raised up to 90° C. to have a titanium trichloride catalytic component separate out. However, to ensure complete separation of the titanium trichloride catalytic component, the temperature was further kept at 90° C. for 30 minutes. Following this, the separated matter was immediately filtrated in a dry nitrogen atmosphere. The cake which was obtained in this manner was washed twice with 100 ml of mono-chloro benzene and three times with 200 ml of n-heptane.

After the washing process, the cake was dried at room temperature under reduced pressure to obtain 35.5 g of a titanium trichloride catalytic component having highly uniform particle diameter measuring 520μ on the average. This titanium trichloride catalytic component thus obtained was analyzed to find that the catalytic component was composed of 26.9% by weight of Ti, 61.2% by weight of Cl, 0.2% by weight of Al and 8.7% by weight of di-n-butyl ether.

Further, the specific surface area of the catalytic component was measured by the B.E.T. method. The result of the measurement was 134 m$^2$/g.

Polymerization Procedures

A polymerization flask which is provided with a side arm and measures 1 liter in content volume was employed. The inside of the flask was dried to thoroughly remove moisture therefrom and then the inside was replaced with dry nitrogen. Then, 400 ml of n-heptane, 108 mg of the above stated titanium trichloride and 1.6 m. mol of diethyl aluminum chloride were put in the flask. The nitrogen inside the polymerization flask was replaced with propylene. The temperature of the inside of the flask was raised up to 70° C. with vibration and stirring and, with the inside pressure of the flask kept at 2 kg/cm$^2$G with propylene gas, the polymerization of propylene was carried out for 2.5 hours.

Upon completion of polymerization, stirring was carried out and the introduction of propylene was stopped. After non-reacted propylene was purged, the catalyst was decomposed by introducing 100 ml of an alcohol mixture consisting of methanol and isopropanol in a mixing ratio of 3:1.

A solid polymer produced by this polymerization process was taken out by filtration. Then, 67.2 g of polypropylene was obtained through washing and drying processes. The filtrate was evaporated and dried to recover 1.2 g of polypropylene which had been dissolved in the polymerization solvent. The results of the polymerization were as shown in Table 1.

Further, for the sake of comparison, the polymer obtained in accordance with Embodiment Example 1 and a commercially available pelletized polypropylene resin product (a product called "Mitsubishi Noblen FL-6" manufactured by Mitsubishi Petrochemical Ind. Co.) are respectively shown in FIG. 6, the former on the right hand side of FIG. 6 and the latter on the left hand side thereof.

Figure 6:
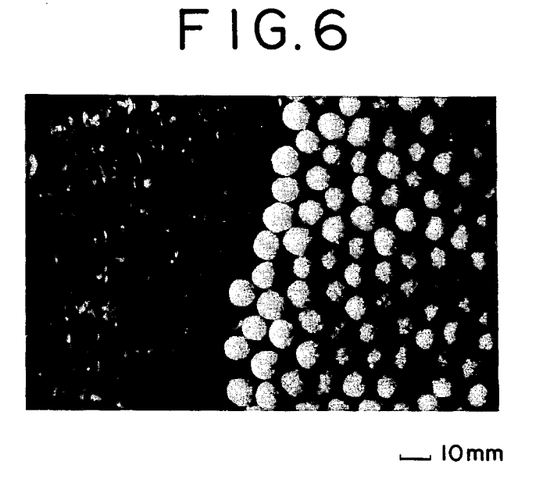

The polymer obtained in accordance with the present invention has particle diameter which is so large that no pelletizing process is required. The particles of it are approximately of a true spherical shape having a good fluidity and a deashing process can be carried out efficiently despite of the large particle diameter.

EMBODIMENT EXAMPLE 2

A titanium trichloride catalytic component was prepared and propylene was polymerized using the catalytic component in exactly the same manner as in Embodiment Example 1 with the exception of that 18.8 ml of diethyl aluminum chloride was employed in this case for the preparation of the titanium trichloride catalytic component. The results of this experiment were as shown in Table 1.

EMBODIMENT EXAMPLE 3

A titanium trichloride catalytic component was prepared and propylene was polymerized in exactly the same manner as in Embodiment Example 2 with the exception of that, during the temperature raising process, 20.3 ml of di-n-butyl ether was added at once when the temperature of the mixed solution reached 50° C. The results of this were as shown in Table 1.

EMBODIMENT EXAMPLE 4

A titanium trichloride catalytic component was prepared and propylene was polymerized in exactly the same manner as in Embodiment Example 3 with the exception of that, during the temperature raising process, 20.3 ml of di-n-butyl ether was added at once when the temperature of the mixed solution reached 70° C. The results of this were as shown in Table 1.

EMBODIMENT EXAMPLE 5

A titanium trichloride catalytic component was prepared and propylene was polymerized in exactly the same manner as in Embodiment Example 4 with the exception of that 40.6 ml of di-n-butyl ether was used in this case. The results of this were as shown also in Table 1.

TABLE I

| Example No. | dc | a | I.I. | p | dp | log σ |
|---|---|---|---|---|---|---|
| 1 | 520 | 83 | 94.7 | 0.43 | 3800 | 0.098 |
| 2 | 50 | 74 | 90.8 | 0.42 | 480 | 0.082 |
| 3 | 40 | 69 | 90.1 | 0.40 | 420 | 0.074 |
| 4 | 50 | 72 | 90.6 | 0.40 | 470 | 0.086 |
| 5 | 60 | 68 | 89.5 | 0.36 | 510 | 0.082 |

EMBODIMENT EXAMPLES 6-9

In each of Embodiment Examples 6 through 9, a titanium trichloride catalytic component was prepared and propylene was polymerized in exactly the same manner as in Embodiment Example 1 with the exception of that the titanium trichloride catalytic component was prepared with the composition of the mixed solvent consisting of monochloro benzene and n-heptane varied to different ratios as shown in Table 2. The results of this were as shown also in Table 2.

TABLE 2

| Example No. | Monochloro benzene concentration (vol %) | dc | a | I.I. | p | dp | log σ |
|---|---|---|---|---|---|---|---|
| 6 | 30 | 1030 | 73 | 92.4 | 0.42 | 6100 | 0.078 |
| 7 | 40 | 330 | 88 | 93.8 | 0.38 | 2120 | 0.072 |
| 8 | 50 | 30 | 81 | 95.0 | 0.39 | 410 | 0.072 |
| 9 | 60 | 10 | 84 | 94.9 | 0.38 | 80 | 0.076 |

Figure 3:
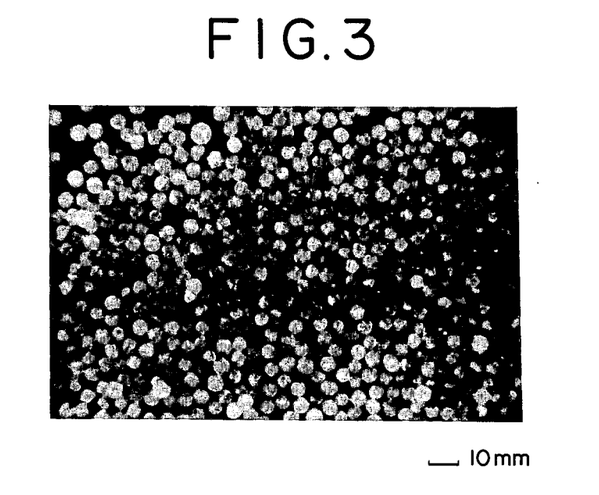

The titanium trichloride catalytic component obtained in accordance with Embodiment Example 7 was stored at temperature 45° C. in nitrogen. FIG. 1 and FIG. 3 shows the ageing deterioration of the stored catalytic component resulting from this storage test and FIG. 3 shows a photograph of a polymer product obtained by the use thereof.

The titanium trichloride catalytic component excels in stability. The polymer has a large particle diameter, high transparency, a shape close to a true sphere, a high degree of fluidity and, despite of its large particle diameter, a good deashing property.

EMBODIMENT EXAMPLES 10-12

In each of Embodiment Examples 10-12, a titanium trichloride catalytic component was prepared and propylene was polymerized in exactly the same manner as in Embodiment Example 1 with the exception of that, in the preparation of the catalytic component, titanium tetrachloride was added as shown in Table 3 and diethyl aluminum chloride and di-n-butyl ether were added in such quantity as to be in the same mole ratios as in Embodiment Example 1. The results of experiments these examples were as shown also in Table 3.

TABLE 3

| Example No. | Preparation of catalytic component Addition quantity of titanium tetrachloride ml) | dc | a | I.I. | p | dp | log σ |
|---|---|---|---|---|---|---|---|
| 10 | 150 | 60 | 82 | 96.9 | 0.41 | 840 | 0.078 |
| 11 | 100 | 40 | 56 | 96.1 | 0.42 | 530 | 0.084 |
| 12 | 90 | 30 | 39 | 91.4 | 0.35 | 370 | |

Figure 2:
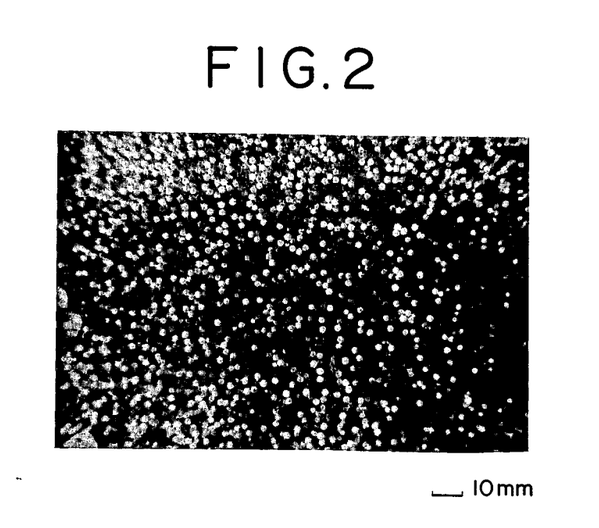
FIGS. 2-4 are photographs respectively showing polymer products obtained in accordance with Embodiment Examples 10, 7 and 41.

FIG. 2 is a photograph showing the polymer obtained in accordance with Embodiment Example 10. As shown in FIG. 2, the polymer product obtainable in accordance with this invention has a large particle diameter, high transparency, a shape close to a true sphere, a good fluidity and a good deashing property despite of its large particle diameter.

EMBODIMENT EXAMPLES 13–16

In each of Embodiment Examples 13–16, the preparation of a titanium trichloride catalytic component and the polymerization of propylene were carried out in exactly the same manner as in Embodiment Example 1 with the exception of that: In the preparation of the catalytic component, the addition quantity of diethyl aluminum chloride was adjusted to be as shown in Table 5 in an equivalent ratio to the titanium tetrachloride. The results of these experiments were as shown also in Table 4.

TABLE 4

| Ex. No. | Preparation of catalytic component Diethyl aluminum chloride/ TiCl$_4$ equivalent ratio | dc | a | I.I. | p | dp | log σ |
|---|---|---|---|---|---|---|---|
| 13 | 0.3 | 20 | 54 | 93.2 | 0.40 | 250 | 0.096 |
| 14 | 1.0 | 490 | 86 | 95.7 | 0.36 | 3520 | 0.092 |
| 15 | 1.4 | 110 | 58 | 90.6 | 0.37 | 970 | 0.084 |
| 16 | 1.8 | 50 | 37 | 93.1 | 0.37 | 480 | 0.074 |

The ageing deterioration of the titanium trichloride catalytic component obtained in accordance with Embodiment Example 14 was as shown in FIG. 1 in the same manner as the one obtained in accordance with Embodiment Example 7.

The titanium trichloride catalytic component obtainable in accordance with the present invention excels in stability.

EMBODIMENT EXAMPLES 17–20

In each of Embodiment Examples 17–20, the preparation of a titanium trichloride catalytic component and the polymerization of propylene were carried out in exactly the same manner as in Embodiment Example 1 with the exception of that: In the preparation of the catalytic component, the addition quantity of di-n-butyl ether was adjusted to be as shown in Table 5 in mole ratio to titanium tetrachloride. The results of these experiments were as shown also in Table 5.

TABLE 5

| Example No. | Preparation of catalytic component Di-n-butyl ether/ TiCl$_4$ mole ratio | dc | a | I.I. | p | dp | log σ |
|---|---|---|---|---|---|---|---|
| 17 | 1.0 | 410 | 63 | 93.2 | 0.37 | 3220 | 0.082 |
| 18 | 1.5 | 60 | 66 | 92.7 | 0.39 | 680 | 0.090 |
| 19 | 2.0 | 50 | 74 | 92.6 | 0.42 | 600 | 0.084 |
| 20 | 2.5 | 30 | 68 | 91.1 | 0.41 | 390 | 0.069 |

EMBODIMENT EXAMPLES 21–25

In each of Embodiment Examples 21–25, the preparation of a titanium trichloride catalytic component and the polymerization of propylene were carried out in exactly the same manner as in Embodiment Example 1 with the exception of that: In the preparation of the catalytic component, various kinds of saturated aliphatic hydrocarbon or alicyclic hydrocarbon were used in place of n-heptane as shown in Table 6. The results of these experiments were as shown also in Table 6.

TABLE 6

| Example No. | Preparation of catalytic component Saturated aliphatic or alicyclic hydrocarbon | dc | a | I.I. | p | dp | log σ |
|---|---|---|---|---|---|---|---|
| 21 | hexane | 210 | 79 | 94.4 | 0.42 | 1820 | 0.078 |
| 22 | cyclohexane | 230 | 78 | 92.1 | 0.39 | 2110 | 0.082 |
| 23 | octane | 470 | 84 | 95.6 | 0.38 | 3530 | 0.088 |
| 24 | methyl cyclohexane | 420 | 81 | 96.0 | 0.38 | 3060 | 0.074 |
| 25 | n-decane | 500 | 79 | 95.7 | 0.37 | 3700 | 0.092 |

EMBODIMENT EXAMPLES 26–33

In each of Embodiment Examples 26–33, the preparation of a titanium trichloride catalytic component and the polymerization of propylene were carried out in exactly the same manner as in Embodiment Example 1 with the exception of that: In preparing the catalytic component, various kinds of hydrocarbon halide were used in place of monochloro benzene as shown in Table 7. The results of these experiments were as shown also in Table 7.

TABLE 7

| Example No. | Preparation of catalytic component Aromatic hydrocarbon halide | dc | a | I.I. | p | dp | log σ |
|---|---|---|---|---|---|---|---|
| 26 | ortho-chloro toluene | 530 | 82 | 96.2 | 0.35 | 3730 | 0.072 |
| 27 | 1,2,4-trichloro benzene | 320 | 84 | 95.9 | 0.39 | 2010 | 0.074 |
| 28 | ortho-dichloro toluene | 390 | 84 | 96.0 | 0.39 | 2670 | 0.072 |
| 29 | para-chloro toluene | 480 | 81 | 95.4 | 0.42 | 3390 | 0.078 |
| 30 | bromo-benzene | 450 | 83 | 94.0 | 0.35 | 3100 | 0.080 |
| 31 | bromo-toluene | 270 | 74 | 91.2 | 0.34 | 2500 | 0.068 |
| 32 | iodo-benzene | 310 | 79 | 91.6 | 0.35 | 2420 | 0.068 |
| 33 | fluoro benzene | 330 | 70 | 93.4 | 0.41 | 2950 | 0.074 |

For the sake of comparison, the polymer obtained in accordance with Embodiment Example 33 and a commercially available pelletized polypropylene resin product (a product called "Mitsubishi Noblen FL-6" manufactured by Mitsubishi Petrochemical Ind. Co.) are respectively shown in FIG. 5, the former on the right hand side and the latter on the left hand side thereof.

Figure 5:
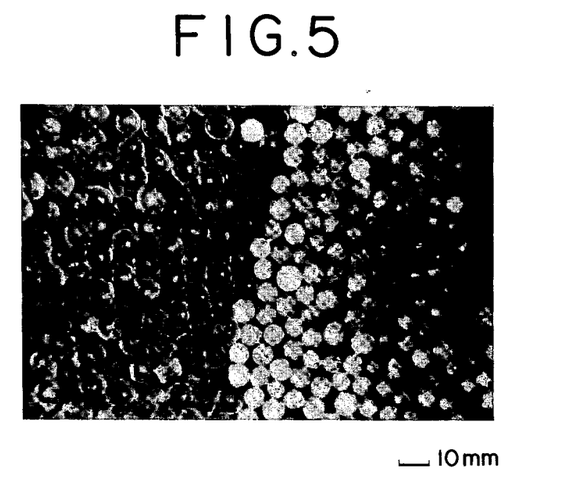
FIGS. 5 and 6 are photographs respectively showing polymer products obtained by Embodiment Examples 33 and 1 along with commercially available pelletized polypropylene resin products which are respectively shown on the left sides of FIGS. 5 and 6.

The polymer obtained in accordance with the present invention has particle diameter which is so large that no pelletizing process is required. The particles are approximately of a true spherical shape having a good fluidity and a deashing process can be carried out efficiently despite of the large particle diameter.

EMBODIMENT EXAMPLES 34-36

In each of Embodiment Examples 34, 35 and 36, the preparation of a titanium trichloride catalytic component and the polymerization of propylene were carried out in exactly the same manner as in Embodiment Example 1 with the exception of that, in preparing the titanium trichloride catalytic component, various kinds of organic ether compounds were used as shown in Table 8 in place of di-n-butyl ether. The results of the experiments of these examples were as shown also in Table 8.

TABLE 8

| Example No. | Preparation of catalytic component Organic ether compound | dc | a | I.I. | p | dp | log $\sigma$ |
|---|---|---|---|---|---|---|---|
| 34 | diethyl ether | 130 | 49 | 92.1 | 0.41 | 1330 | 0.078 |
| 35 | di-n-propyl ether | 190 | 71 | 94.4 | 0.44 | 1890 | 0.080 |
| 36 | di-n-amyl ether | 190 | 70 | 93.6 | 0.44 | 1990 | 0.070 |

EMBODIMENT EXAMPLES 37-41

In each of Embodiment Examples 37-41, the preparation of a titanium trichloride catalytic component and the polymerization of propylene were carried out in exactly the same manner as in Embodiment Example 1 with the exception of that, for the preparation of the catalytic component, various kinds of organo-aluminum compounds were used in place of the diethyl aluminum chloride as shown in Table 9. The results of the experiments of these examples were as shown also in Table 9.

TABLE 9

| Example No. | Preparation of catalytic component Organo-aluminum compound | dc | a | I.I. | p | dp | log $\sigma$ |
|---|---|---|---|---|---|---|---|
| 37 | DEAL-H See Note 1 below | 530 | 83 | 96.8 | 0.39 | 3420 | 0.068 |
| 38 | DIBAL-H See Note 2 below | 530 | 80 | 97.4 | 0.38 | 3680 | 0.074 |
| 39 | EASC See Note 3 below | 30 | 83 | 96.1 | 0.38 | 440 | 0.074 |
| 40 | EADC See Note 4 below | 30 | 74 | 96.4 | 0.39 | 400 | 0.072 |
| 41 | DIBAC See Note 5 below | 470 | 81 | 95.5 | 0.36 | 3130 | 0.078 |

Figure 4:
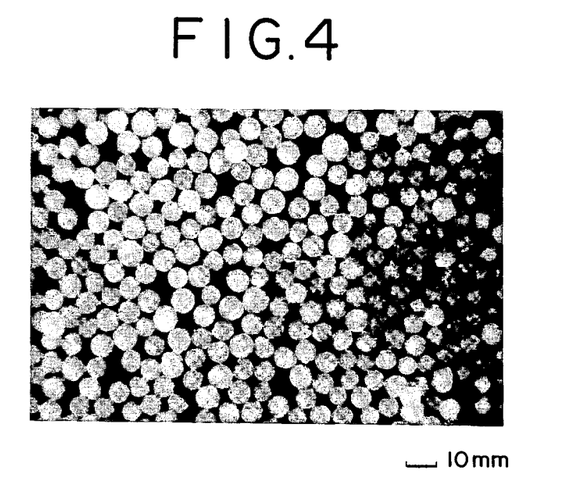

NOTES
1 DEAL-H: diethyl aluminum hydride
2 DIBAL-H: diisobutyl aluminum hydride
3 EASC: ethyl aluminum sesqui-chloride
4 EADC: ethyl aluminum dichloride
5. DIBAC: diisobutyl aluminum chloride A photograph of the polymer obtained in accordance with Embodiment Example 41 is as shown in FIG. 4. The polymer product obtainable in accordance with this invention has a large particle diameter, high transparency, a shape close to a true sphere, a good fluidity and a good deliming property despite of its large particle diameter.

EMBODIMENT EXAMPLE 42

Preparation of the Titanium Trichloride Catalytic Component:

The inside of a four-necked flask of 500 ml equipped with a stirrer was replaced with dry nitrogen. Following this, 250 ml of a mixed solvent which consists of monochloro benzene and n-heptane with 30% by volume of the monochloro benzene mixed therein as aromatic hydrocarbon halide was introduced into the flask. To this was added 24.2 ml of titanium tetrachloride (0.22 mol, corresponding to 0.88 mol TiCl$_4$/l mixed solvent). The mixed solution was kept at a temperature between 20° and 23° C. with stirring. To this mixed solution was added by dropping with stirring 55.6 ml of di-n-butyl ether (0.33 mol—the mole ratio of di-n-butyl ether to the titanium tetrachloride was equivalent to 1.5) over a period of 10 minutes.

After the dropping process, 18.8 ml of diethyl aluminum chloride (0.15 mol, the addition quantity of the diethyl aluminum chloride relative to the titanium tetrachloride corresponded to 1.36 equivalent) was added to the mixture over a period of 40 minutes by dissolving it in 60 ml of monochloro benzene. The mixture solution was then heated to have the temperature thereof rise 1° C. at every 4.2 minutes. When the temperature of the mixed solution reached 70° C., heating was stopped to allow the solution cooled down to 20° C. Then 6.8 ml of di-n-butyl ether was again added with thorough stirring (0.040 mol, the mole ratio thereof to the titanium tetrachloride in the mixed solution corresponded to 0.18).

Following this, the mixed solution was heated to have the temperature rise 1° C. at every 3.9 minutes on the average until the mixed solution reached 80° C. to allow a titanium trichloride catalytic component to separate out therefrom. To ensure complete separation of the titanium trichloride catalytic component, the solution was kept at 80° C. for 60 minutes after the temperature raising process. Then, the separated matter was immediately filtrated in a dry nitrogen atmosphere. A cake which was thus obtained was washed twice with 100 ml of monochloro benzene and three times with 200 ml of n-hexane.

After washing, the washed cake was dried at room temperature under reduced pressure to obtain 42.0 g of titanium trichloride catalytic component having highly uniform particle diameter measuring 40$\mu$ on the average. The titanium trichloride catalytic component thus obtained was analyzed to find that the catalytic component was composed of 25.8% by weight of Ti, 60.7% by weight of Cl, 0.2% by weight of Al, and 9.1% by weight of di-n-butyl ether. Further, the specific surface area of the catalytic component was measured by the B.E.T. method. The result of the measurement was 120 m²/g.

Polymerization Procedures

Propylene was polymerized by using this titanium trichloride catalytic component in exactly the same manner as the polymerization procedures used in Embodiment Example 1. The results of polymerization were as shown in Table 10.

EMBODIMENT EXAMPLES 43-45

In each of Embodiment Examples 43-45, the preparation of titanium trichloride catalytic component and the polymerization of propylene were carried out in exactly the same manner as in Embodiment Example 42 with the exception of that the quantity of di-n-butyl ether added during the temporary cooling period was set at 0.4 ml, 18.8 ml or 88.6 ml. The results of the experiments of these examples were as shown in Table 10.

TABLE 10

| Example No. | Preparation of catalytic component Add. qty of organic ether compound (ml) | dc | a | I.I. | p | dp | log σ |
|---|---|---|---|---|---|---|---|
| 42 | 6.8 | 40 | 76 | 91.2 | 0.42 | 660 | 0.074 |
| 43 | 0.4 | 40 | 70 | 90.1 | 0.38 | 650 | 0.074 |
| 44 | 18.8 | 50 | 77 | 92.0 | 0.39 | 720 | 0.078 |
| 45 | 88.6 | 50 | 74 | 91.0 | 0.35 | 720 | 0.080 |

EMBODIMENT EXAMPLES 46-48

In each of Embodiment Examples 46-48, the preparation of titanium trichloride catalytic component and the polymerization of propylene were carried out in exactly the same manner as in Embodiment Example 42 with the exception of that, in preparing the catalytic component, various organic ethers were employed in place of di-n-butyl ether as shown in Table 11. The results of the experiments of these examples were as shown also in Table 11.

TABLE 11

| Example No. | Preparation of catalytic component Organic ether compound | dc | a | I.I. | p | dp | log σ |
|---|---|---|---|---|---|---|---|
| 46 | diethyl ether | 30 | 68 | 90.0 | 0.39 | 600 | 0.70 |
| 47 | di-n-propyl ether | 40 | 70 | 90.5 | 0.40 | 650 | 0.72 |
| 48 | di-n-amyl ether | 60 | 76 | 91.0 | 0.40 | 750 | 0.072 |

EMBODIMENT EXAMPLES 49-51

In each of Embodiment Examples 49-51, the preparation of a titanium trichloride catalytic component and the polymerization of propylene were carried out in exactly the same manner as in Embodiment Example 42 with the exception of that, during the temporary cooling period, titanium tetrachloride was added as shown in Table 12 in place of addition of 0.040 mol. of di-n-butyl ether. The results of experiments were as shown also in Table 12.

TABLE 12

| Example No. | Preparation of catalytic component Add. qty of tetrachloride (ml) | dc | a | I.I. | p | dp | log σ |
|---|---|---|---|---|---|---|---|
| 49 | 4.4 | 50 | 76 | 93.5 | 0.41 | 720 | 0.082 |
| 50 | 17.6 | 55 | 75 | 97.8 | 0.43 | 760 | 0.076 |
| 51 | 33 | 50 | 71 | 97.9 | 0.44 | 710 | 0.074 |

EMBODIMENT EXAMPLES 52 AND 53

In each of Embodiment Examples 52 and 53, the preparation of a titanium trichloride catalytic component and the polymerization of propylene were carried out in exactly the same manner as in Embodiment Example 42 with the exception of that, during the temporary cooling period, a complex consisting of di-n-butyl ether and titanium tetrachloride in the ratio of 1:1 was added in place of di-n-butyl ether. The results of experiments of these embodiment examples were as shown in Table 13.

TABLE 13

| Example No. | Preparation of catalytic component Addition qty of complex (mol) | dc | a | I.I. | p | dp | log σ |
|---|---|---|---|---|---|---|---|
| 52 | 0.08 | 50 | 89 | 96.6 | 0.43 | 710 | 0.082 |
| 53 | 0.20 | 45 | 82 | 96.2 | 0.43 | 680 | 0.078 |

EMBODIMENT EXAMPLES 54 AND 55

In each of Embodiment Examples 54 and 55, the preparation of a titanium trichloride catalytic component and the polymerization of propylene were carried out in exactly the same manner as in Embodiment Example 42 with the exception of that, during the temporary cooling period, a mixture consisting of di-n-butyl and titanium tetrachloride in the ratio of 1:1 was added in place of di-n-butyl ether. The results of experiments of these embodiment examples were as shown in Table 14.

TABLE 14

| Example No. | Preparation of catalytic component Add. qty of mixture, 6* | dc | a | I.I. | p | dp | log σ |
|---|---|---|---|---|---|---|---|
| 54 | 0.07 | 50 | 86 | 97.0 | 0.45 | 720 | 0.088 |
| 55 | 0.19 | 45 | 83 | 96.5 | 0.42 | 670 | 0.092 |

NOTE 6*Expressed in mole ratio of titanium tetrachloride in mixture.

EMBODIMENT EXAMPLE 56

The inside of a stainless steel autoclave measuring 2 liters in content volume was replaced with dry nitrogen. Then, 45 mg of the titanium trichloride catalytic component obtained in accordance with the Embodiment Example 1 and 4 m. mol of diethyl aluminum chloride were placed in the autoclave. Following this, 10 m. mol of hydrogen and 500 g of liquefied propylene were introduced with pressure into the autoclave to carry out polymerization at 80° C. for one hour. After one hour, heating and stirring were stopped and non-reacted propylene was purged to obtain 156 g of a polymer. The results of polymerization were: a=93, H.I.=96.4, $p=0.42$, dp=13100, log $\sigma=0.078$.

EMBODIMENT EXAMPLE 57

The inside of a stainless steel autoclave measuring 2 liters in content volume and being equipped with a stirrer was replaced with dry nitrogen before carrying out the experiment. Then, 50 g of stereospecific polypropylene which had been prepared by extracting an atactic polypropylene with boiling n-heptane and then through drying, classification and deoxidization was put in the autoclave. Following this, 42 mg of a titanium trichloride catalytic component which had been prepared in exactly the same manner as in Embodiment Example 1 and 10 ml of n-heptane containing 4 m. mol of diethyl aluminum chloride were put in the autoclave. The inside temperature of the autoclave was then adjusted to 70° C. and supply of propylene is started to carry out gas phase polymerization.

After polymerization was carried out under a pressure of 25 kg/cm$^2$G for two hours, stirring, heating and the supply of propylene were stopped and non-reacted propylene was purged to obtain 196 g of polypropylene. The results of polymerization were: a=67, H.I.=92.3, $\rho$=0.39, dp=9200, and log $\sigma$=0.068.

EMBODIMENT EXAMPLE 58

One liter of n-heptane, 5 m. mol of diethyl aluminum chloride and 48 mg of a titanium trichloride catalytic component prepared in exactly the same manner as in Embodiment Example 1 were put in a stainless steel autoclave measuring 2 liters in content volume and being equipped with a stirrer.

The inside temperature of the autoclave was raised by heating up to 70° C. Then, an ethylene-propylene mixture gas containing 5.2% by volume of ethylene was introduced into the autoclave to carry out polymerization for two hours. After two hours, heating, stirring and the supply of the mixture gas were stopped and non-reacted mixture gas was purged. The content of the autoclave was filtrated, washed and dried to obtain 149 g of a polymer. The polymer thus obtained was analyzed by means of infrared absorption spectrum to find that the polymer contained 3.5% of ethylene. The results of polymerization were: a=141, I.I.=72.3 and $\rho$=0.24.

COMPARISON EXAMPLES 1-4

In each of the comparison examples 1-4, a titanium trichloride catalytic component was prepared in exactly the same manner as in Embodiment Examples 6-9 with the exception of that a mixture consisting of monochloro benzene and toluene was employed as mixed solvent and that diethyl ether was employed as organic ether compound. Through each of these experiments, however, it was impossible to control the average particle diameter of the catalytic component thus obtained as shown in Table 15.

TABLE 15

| Comparison Example No. | Concentration of monochloro benzene (% by volume) | dc |
|---|---|---|
| 1 | 30 | 10 |
| 2 | 40 | 15 |
| 3 | 50 | 10 |
| 4 | 60 | 10 |

COMPARISON EXAMPLE 5

A conventional high activity catalyst was prepared in accordance with the Japanese patent application laid-open No. 47-34478 by treating the $\beta$-eutectic mixture with a complex-making agent to remove a portion of an aluminum component included in the $\beta$-eutectic mixture and then by treating it in titanium tetrachloride to obtain a $\delta$-eutectic mixture presenting a dark purple color. The $\delta$-eutectic mixture thus obtained as high activity catalyst was stored in nitrogen at temperature 45° C. and the ageing deterioration of it was measured. The results of measurement were as shown in FIG. 1. Compared with this high activity catalyst, the titanium trichloride catalytic components obtained in accordance with Embodiment Examples 7 and 14 shows excellent stability.

What is claimed is:

1. A titanium trichloride catalytic component for polymerization of $\alpha$-olefin obtained in the following manner: in having a titanium trichloride catalytic component separate out of a solution prepared by dissolving titanium tetrachloride, an organic ether compound having the formula ROR', wherein R and R' are alkyl groups which are the same or different with at least one of them containing 5 or fewer carbon atoms, and an organo-aluminum compound having the formula AlR$_n$X$_{3-n}$ wherein R is an alkyl group of 1-10 carbons, X is halogen or hydrogen and n is an integer of $0<n\leq3$, in a solvent, said solvent is a mixed solvent prepared by having 20 to 70% by volume of a concomitant aromatic hydrocarbon halide included in a mixed solvent consisting of saturated aliphatic hydrocarbon and/or alicyclic hydrocarbon; said organo-aluminum compound, said titanium tetrachloride and said organic ether compound are added at a solvent temperature not exceeding 55° C. to form a system; following this, the temperature of the system is raised up to a value between 45° and 150° C. over a period of time between 10 minutes and 24 hours; and, during the temperature raising process, the organic ether compound and/or titanium tetrachloride is further added in such amount that the molar ratio of the total amount of said ether to the total amount of titanium tetrachloride added to the system does not exceed 4, to allow a solid titanium trichloride catalytic component of average particle diameter between 10 and 1000$\mu$ to separate.

2. A titanium trichloride catalytic component according to claim 1, wherein said organic ether compound to be added during said temperature raising process is a mixture or a complex consisting of an organic ether compound and titanium tetrachloride.

3. A titanium trichloride catalytic component according to claim 1 or 2, wherein said aromatic hydrocarbon halide is an aromatic hydrocarbon chloride and/or an aromatic hydrocarbon bromide.

4. A titanium trichloride catalytic component according to claim 1 or 2, wherein said saturated aliphatic hydrocarbon is of a boiling point at least 65° C.

5. A titanium trichloride catalytic component according to claim 1 or 2, wherein said alicyclic hydrocarbon is of a boiling point at least 65° C.

6. A titanium trichloride catalytic component according to claim 1 or 2, wherein said titanium tetrachloride is dissolved in said mixed solvent as component in quantity not exceeding 5 mol for 1 liter of said mixed solvent; said organic ether compound is dissolved therein in quantity 0.8 to 3 mol for 1 mol of said titanium tetrachloride; and said organo-aluminum compound is dissolved therein in quantity 0.3 to 1.8 equivalent of said titanium tetrachloride.

7. A titanium trichloride catalytic component according to claim 1 or 2, wherein said organic ether compound and/or titanium tetrachloride to be added during said temperature raising process is added at a temperature within a range from 40° to 70° C.

8. A titanium trichloride catalytic component according to claim 1 or 2, wherein said organic ether compound and/or titanium tetrachloride to be added during said temperature raising process is added during a temporary cooling period in cases where a temporary cooling period is included in said temperature raising process.

9. A titanium trichloride catalytic component suitable for polymerization of α-olefin to form a transparent polymer, said catalytic component being obtained in the following manner: in having a titanium trichloride catalytic component separate out of a solution prepared by dissolving titanium tetrachloride, an organic ether compound having the formula ROR', wherein R and R' are alkyl groups which are the same or different, with at least one of them containing 5 or fewer carbon atoms, and an organo-aluminum compound having the formula $AlR_nX_{3-n}$ wherein R is an alkyl group of 1–10 carbons, X is halogen or hydrogen and n is an integer of $0 < n \leq 3$, in a solvent, said solvent is a mixed solvent prepared by having 20 to 70% by volume of a concomitant aromatic hydrocarbon halide included in a mixed solvent consisting of saturated aliphatic hydrocarbon and/or alicyclic hydrocarbon; said organo-aluminum compound, said titanium tetrachloride and said organic ether compound are added at a solvent temperature not exceeding 55° C. to form a system; following this, the temperature of the system is raised up to a value between 45° and 150° C. over a period of time between 10 minutes and 24 hours; and, during the temperature raising process, the organic ether compound and/or titanium tetrachloride is further added in such amount that (a) the molar ratio of the total amount of said ether to the total amount of titanium tetrachloride added to the system does not exceed 4, and (b) the titanium tetrachloride added during the temperature raising process is at least 0.01 mol for each mol of titanium tetrachloride contained in said mixed solvent, to allow a solid titanium trichloride catalytic component of average particle diameter between 10 and 1000μ to separate.

* * * * *